United States Patent [19]
Lin et al.

[11] Patent Number: 5,581,579
[45] Date of Patent: Dec. 3, 1996

[54] METHOD AND APPARATUS TO ADAPTIVELY CONTROL THE FREQUENCY OF RECEPTION IN A DIGITAL WIRELESS COMMUNICATION SYSTEM

[75] Inventors: Nan-Sheng Lin, Union City, Calif.; Ravi Subramanian, E. Brunswick, N.J.; Kenkichi Suzuki, Ichikawa, Japan

[73] Assignee: TCSI Corporation, Berkeley, Calif.

[21] Appl. No.: 523,032

[22] Filed: Sep. 1, 1995

Related U.S. Application Data

[63] Continuation of Ser. No. 108,113, Aug. 17, 1993, abandoned.

[51] Int. Cl.$^6$ .................................................. H04L 27/22
[52] U.S. Cl. .......................... 375/331; 375/283; 329/304
[58] Field of Search ........................................ 375/281, 283, 375/324–326, 330–331, 340, 343–345, 348; 329/304; 455/192.1, 192.2

[56] References Cited

U.S. PATENT DOCUMENTS

| | | | |
|---|---|---|---|
| 4,466,108 | 8/1984 | Rhodes | 375/329 |
| 4,558,460 | 12/1985 | Tanaka et al. | 381/86 |
| 4,879,728 | 11/1989 | Tarallo | 375/324 |
| 4,947,409 | 8/1990 | Raith et al. | 375/344 |
| 5,001,724 | 3/1991 | Birgenheier et al. | 329/304 |
| 5,012,491 | 4/1991 | Iwasaki | 375/343 |
| 5,018,166 | 5/1991 | Tjahjadi et al. | 375/232 |
| 5,027,432 | 6/1991 | Skala et al. | 455/238.1 |
| 5,040,192 | 8/1991 | Tjahjadi | 375/223 |
| 5,187,719 | 2/1993 | Birgenheier et al. | 375/261 |
| 5,202,901 | 4/1993 | Chennakeshu et al. | 329/304 |
| 5,263,026 | 11/1993 | Parr et al. | 375/232 |
| 5,272,446 | 12/1993 | Chalmers et al. | 329/304 |
| 5,274,670 | 12/1993 | Serizawa et al. | 375/231 |
| 5,276,706 | 1/1994 | Critchlow | 375/343 |
| 5,282,228 | 1/1994 | Scott et al. | 375/344 |

FOREIGN PATENT DOCUMENTS

WO94197704  1/1994  WIPO.

OTHER PUBLICATIONS

A. Higashi et al., NTT Radio Communication Systems Lab., "BER Performance of Mobile Equalizer Using RLS Algorithm in Selective Fading Environment".

S. Sampei, "Development of Japanese Adaptive Equalizing Technology Toward High Bit Rate Data Transmission in Land Mobile Communications", IEICE Transactions, vol. E 74, No. 6, Jun. 1991.

Y. Liu, "Bi–Directinal Equalization Technique for TDMA Communication Systems over Land Mobile Radio Channels," pp. 1458–1462, Globecom '91.

*Primary Examiner*—Young T. Tse
*Attorney, Agent, or Firm*—Limbach & Limbach L.L.P.; Ronald L. Yin

[57] ABSTRACT

In a digital wireless communication system operating between a first unit and a second unit, the first unit transmits a digitally encoded RF signal at a first frequency in a plurality of a non-contiguous time slots to the second unit. The second unit receives the digitally encoded RF signals. The received RF digitally encoded signal is converted to an intermediate frequency (IF). An A to D converter samples the received IF digitally encoded signals and generates a plurality of discrete binary symbols during one of the plurality of non-contiguous time slots. A phase error signal is generated for each one of the plurality of discrete binary symbols. A frequency error signal is generated for the subsequent symbol in accordance with $\Delta f(n+1)=\Delta f(n)+g_1 (\Theta(n)-\widehat{\Theta}(n))$. The conversion of the RF signal to intermediate frequency is controlled in response to the frequency error signal. The control is adjusted after the one time slot but prior to the commencement of a subsequent one of the plurality of non-contiguous time slots.

13 Claims, 8 Drawing Sheets

5,581,579

METHOD AND APPARATUS TO ADAPTIVELY CONTROL THE FREQUENCY OF RECEPTION IN A DIGITAL WIRELESS COMMUNICATION SYSTEM

This is a continuation of application Ser. No. 08/108,113 filed on Aug. 17, 1993, now abandoned.

TECHNICAL FIELD

The present invention relates to a method and an apparatus to adaptively control the frequency of reception in a digital wireless communication system. More particularly, the present invention relates to a method and apparatus to adaptively control the frequency of reception transmitted in a plurality of non-contiguous time slots.

BACKGROUND OF THE INVENTION

Wireless communication is well known in the art. Heretofore, one type of wireless communication is known as a "cellular" communication wherein each stationary unit receives and transmits signals to mobile units within its allocated geographical region, called a cell. As mobile units move from one cell to another, communication is transferred from one stationary unit in one cell to another stationary unit in another cell.

Heretofore, cellular communication is analog based and has risen in popularity. However, as a result, the airways have become increasingly crowded and the capacity of the communication system to take on new subscribers is becoming increasingly of a problem. Digital cellular communication offers an opportunity to increase the number of subscribers to operate within the cellular system. However, to bridge the gap between the current analog cellular system and the digital cellular system, a standard has been proposed. The standard proposed by EIA/TIA (Electronic Industry Association/Telecommunications Industry Association), known as the IS-54 standard, specifies that communication between a mobile unit and a base unit should be capable of operating in both the analog and the digital mode. More particularly, when operating in the digital wireless communication mode, the IS-54 standard specifies that communication between a base unit and a mobile unit occur in a Time Division Multiplex Access (TDMA) mode. In a TDMA mode, the digitally encoded signal is transmitted in a plurality of non-contiguous time slots. Communication between a base unit and a mobile unit occurs in an assigned time slot, within each frame. In each time slot, digitally encoded synchronization signal must first be transmitted followed by the digitally encoded data signal. Furthermore, within the digitally encoded data signal, at a predetermined time period, a digitally encoded marker signal is transmitted. These are all well known standards in the IS-54 specification.

One of the problems of a digital wireless communication system is the problem of equalizing the digitally encoded signals. As the digitally encoded signal is transmitted from one unit to another, through a multiplicity of data paths, the various signals arriving at the other unit can cause delay spread between the digitally encoded signals. This is known as inter-symbol interference. An equalizer is a digital hardware/software apparatus which corrects inter-symbol interference between the digitally encoded signals arriving from a plurality of signal paths.

In the prior art, a number of equalization strategies is disclosed. See, for example, "BER Performances Of Mobile Radio Equalizer Using RLS Algorithm In Selective Fading Environment" by Akihiro Higashi, Hiroshi Suzuki; "Bi-Directional Equalization Technique For TDMA Communication Systems Over Land Mobile Radio Channels" by Yow-Jong, Liu, page 1458–1462, Globecom '91; and "Development Of Japanese Adaptive Equalization Technology Toward High Bit Rate Data Transmission In Land Mobile Communications" by Seiichi Sampei, page 1512–1521 IEICE Transactions, Volume E, 74, No. 6, June, 1991.

Although the present invention, in the preferred embodiment, discloses a wireless communication systems using the IS-54 standard capable of operating in both analog and digital mode, it should be apparent that the invention, as set forth herein, can be used in any digital, wireless, communication system.

SUMMARY OF THE INVENTION

In the present invention an apparatus adaptively controls the frequency of reception in a digital wireless communication system operating between a first unit and a second unit. The first unit transmits a digitally encoded signal at a first frequency in a plurality of non-contiguous time slots to the second unit. The second unit has an antenna means for receiving the digitally encoded signal. It also has means coupled to the antenna means for converting the received digitally encoded signal into a lower frequency. A sampling means receives the lower frequency received digitally encoded signal and generates a plurality of discrete binary symbols during one of the plurality of non-contiguous time slots. A determining means receives each one of the plurality of discrete binary symbols and determines a phase error signal thereof. Means for generating a frequency error signal for a subsequent symbol in accordance with $\Delta f(n+1)=\Delta f(n)+ g_1(\Theta(n)-\Theta(n))$ is then calculated. Finally, means for controlling the converting means in response to the frequency error signal after the one time slot but prior to the commencement of a subsequent one of said plurality of non-contiguous time slots is disclosed.

A method of adaptively controlling the frequency of reception in a digital wireless communication system is also disclosed.

DETAILED DESCRIPTION OF THE DRAWINGS

Figure 1:
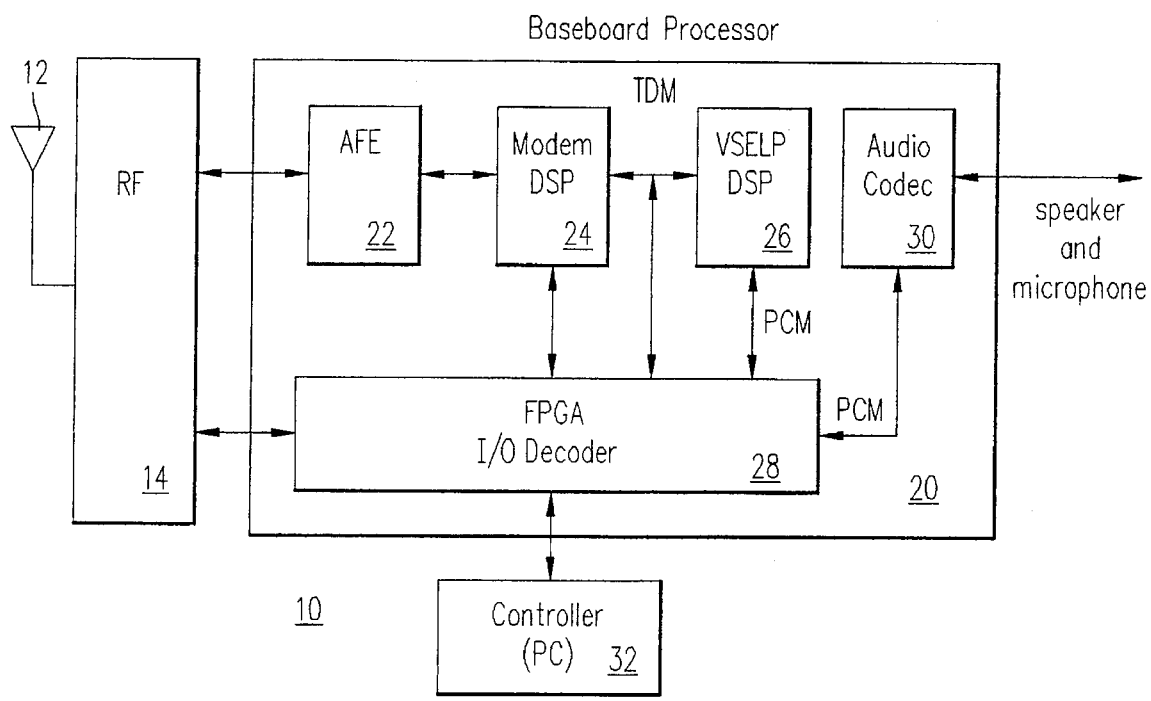
FIG. 1 is a block level diagram of a wireless communication unit which is a remote unit or is a portion of a stationary unit of a digital wireless communication system.

Referring to FIG. 1 there is shown a schematic block level diagram of a communication unit 10. In a wireless communication system between a mobile unit and a stationary unit, the communication unit 10 is that of the mobile unit. In addition, the schematic block level diagram shown in FIG. 1 represents a portion of the stationary unit. More particularly, as will be appreciated by those having ordinary skilled in the art, the stationary unit would comprise additional units to accomplish function such as hand off and the ability to process many remote units at the same time.

The communication unit 10 comprises an antenna 12 which receives the RF (radio frequency) wireless signal. The RF signal is then processed by an RF processing unit 14. From the RF processing unit 14, the signal is then passed to a base band processor 20. The base band processor 20 comprises in AFE (analog front end) 22, which receives the RF signal from the RF processing unit 14. The signal from the AFE unit 22 is then received by a Modem DSP 24. The signal from the Modem DSP 24 is received by a VSELP DSP 26. A FPGA (Field Programmable Gate Array) 28 communicates with the Modem DSP 24 and the VSELP DSP 26. The FPGA 28 also communicates with an audio codec 30. In addition, the FPGA 28 is connected to a controller 32. Finally, the audio codec 30 is connected to a conventional speaker and microphone.

As previously discussed, the communication unit 10 in the preferred embodiment implements the IS-54 standard. Thus, the communication unit 10 can process both analog wireless signals as well as digital by encoded wireless signals. In general, the above-identified components operate in the following manner:

RF processing unit 14 receives the analog or the digitally encoded RF signal and converts them into a baseband signal for further processing by the based band processor 20. When operating in the digital mode, the RF processing unit 14 also demodulates the received IF signal to produce the analog I,Q signals.

The AFE unit 22 implements analog to digital and digital to analog conversions with associated filtering functions for the I/Q signals. In addition, it provides for four (one not used) channel D/A for RF control. It also has one A/D for RSSI (Receive Signal Strength Indicator) measurement.

The Modem DSP 24 in the preferred embodiment is a digital signal processor which is ROM coded (TMS 320c51) which implements analog mode processing, modem functions in the digital mode, as well as FACCH (Fast Access Control Channel)/SACCH (Slow Access Control Channel) error control functions. FACCH/SACCH are defined by the IS-54 standard and is well known in the art. The modem processor 24 interfaces with the FPGA I/O decoder 28 through its serial port. Through the FPGA 28, the FPGA 28 then communicates with the controller 32. The Modem DSP 24 also maintains the time division multiplex (TDM) bus for communication with the VSELP DSP processor 26 and the audio codec 30 when operating in the analog mode. The Modem DSP 24 communicates with the RF processor 14 through the AFE 22.

The VSELP DSP 26 is also a ROM coded DSP (TMS 320c51) which implements the VSELP codec functions, which is a speech compression algorithm. In addition, it performs error control functions associated with the speech frame and echo cancellation. Finally, it communicates with the Modem DSP 24 via the TDM port and is powered down during the analog mode operation.

The audio codec 30 implements the speech A to D and D to A conversion and associated filtering. It interfaces directly to the speaker and to the microphone (not shown). The speech samples are exchanged with the Modem DSP 24 through the TDM port and TDM to pulse code modulation (PCM) conversion circuit in the FPGA I/O decoder 28 during the analog mode operation. In addition, during the digital mode operation, the audio codec 30 interfaces with the VSELP DSP 26 through the PCM bus.

The FPGA I/O decoder 28 consist of a first FPGA1 28a, a second FPGA2 28b, and a PAL (Programmable Array Logic—not shown), for I/O address decoding. The first FPGA1 28a includes timing generation circuitry, wideband data demodulator, sync control interface, and baseband test interface. The second FPGA2 28b includes an interface (UPIF) to interface with the controller 32. In addition, it communicates with the audio codec 30 and the VSELP DSP 26 through the PCM port and has TDM/PCM conversion circuitry. Finally, the second FPGA2 28b has a sampling clock (interrupt control).

Figure 2:
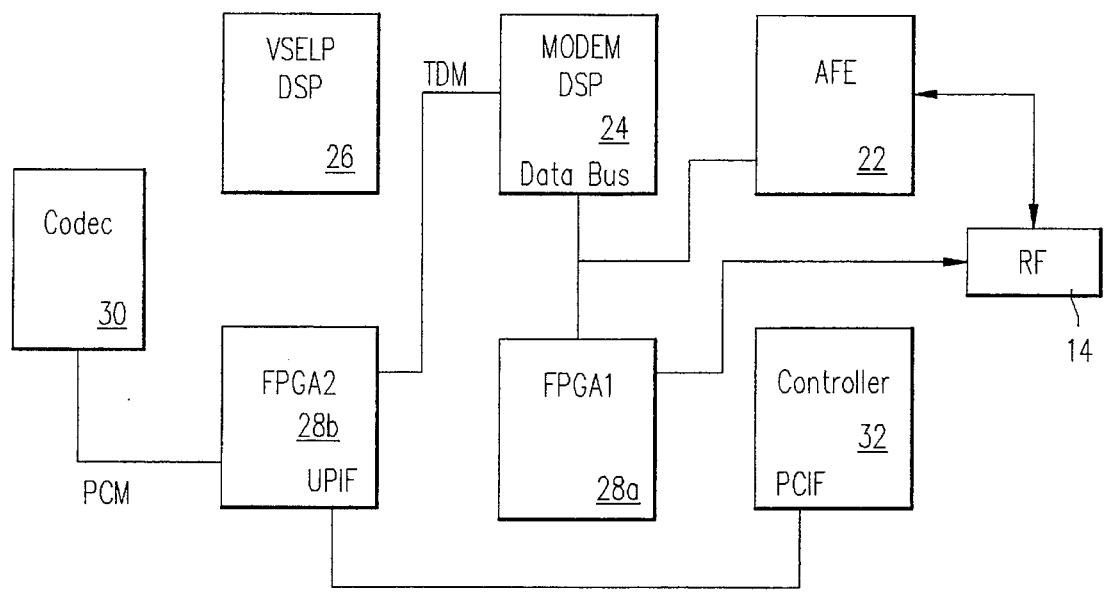
FIG. 2 is a block level diagram of the signal flow path when the wireless communication unit shown in FIG. 1 is operating in the analog mode.

Referring to FIG. 2, there is shown the signal flow for the communication unit 10 when operating in the analog mode. As can be seen, when operating in the analog mode, the VSELP DSP 26 is completely "turned off". The analog wireless signal is received by the RF unit 14 and is supplied to the AFE unit 22. From the AFE unit 22, the signal is supplied to the Modem DSP 24. The Modem DSP 24 through its TDM port communicates with the second FPGA2 28b. From the PCM port of the second FPGA2 28b, the second FPGA2 28b communicates with the codec 30.

Figure 3:
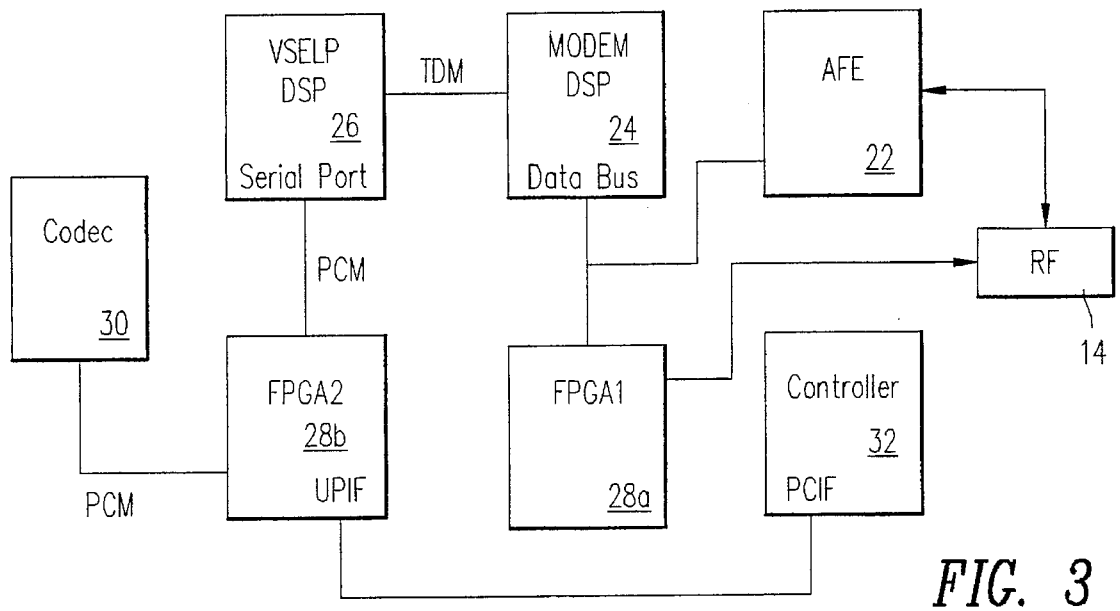
FIG. 3 is a block level diagram of the signal flow path when the wireless communication unit shown in FIG. 1 is operating in a digital mode.

Referring to FIG. 3, there is shown a block level diagram of the signal flow when the communication unit 10 operates in the digital mode. In this mode, the VSELP DSP 26 is actively involved in the processing of the received digitally encoded signal.

Figure 11:
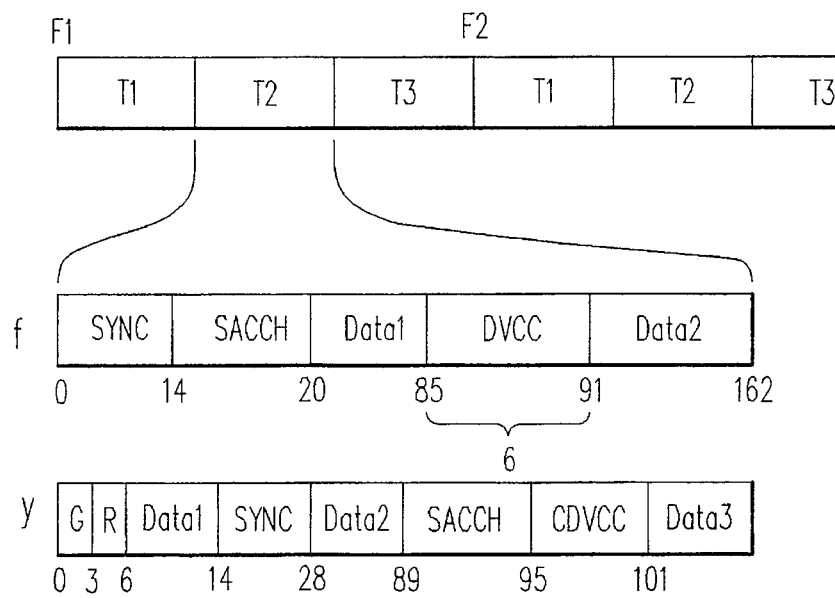
FIG. 11 is a timing diagram of the protocol of communication between like units of FIG. 1, when operating in a digital mode.

Referring to FIG. 11, there is shown a timing diagram of a digitally encoded signal when the communication unit 10 operates in the digital mode, implementing in particular, the IS-54 standard. The communication between a base unit and a mobile unit is divided into a plurality of frames, designated as F1, F2, etc., with each frame lasting 20 msec. In the digital mode of operation, each 20 msec. frame is further divided into a plurality of time slots, shown as T1, T2 and T3. Using the capability of voice compression as performed by VSELP processor 26, at full rate, 8 kbits/sec., for the same frame at the same frequency, in the digital mode, the base unit can serve to communicate with three different mobile units. Further, when the VSELP DSP 26 is operating at half rate compression i.e., 4 kbits per second, communication between the base unit and a plurality of mobile units can occur using a 40 msec frame with each frame divided into six different time slots or serving six users.

Each time slot Tn can accommodate the transmission of 162 symbols or 324 bits. The base unit and the mobile unit communicate over separate frequency channels thereby accomplishing full duplex transmission. The protocol of transmission from the base unit to the mobile unit is shown and designated as f (for forward). The protocol of transmission from the mobile unit to the base unit is shown and is designated as r (for reverse). In the forward protocol, the IS-54 standard dictates that the digitally encoded signal begins with 14 symbols of synchronization signal followed by 148 symbols of data signal, with 6 symbols of DVCC (a marker signal) located in the middle of the data field between symbols 85–91. Thus, within each forward time slot, transmission of 162 symbols include sync and data.

Figure 4:
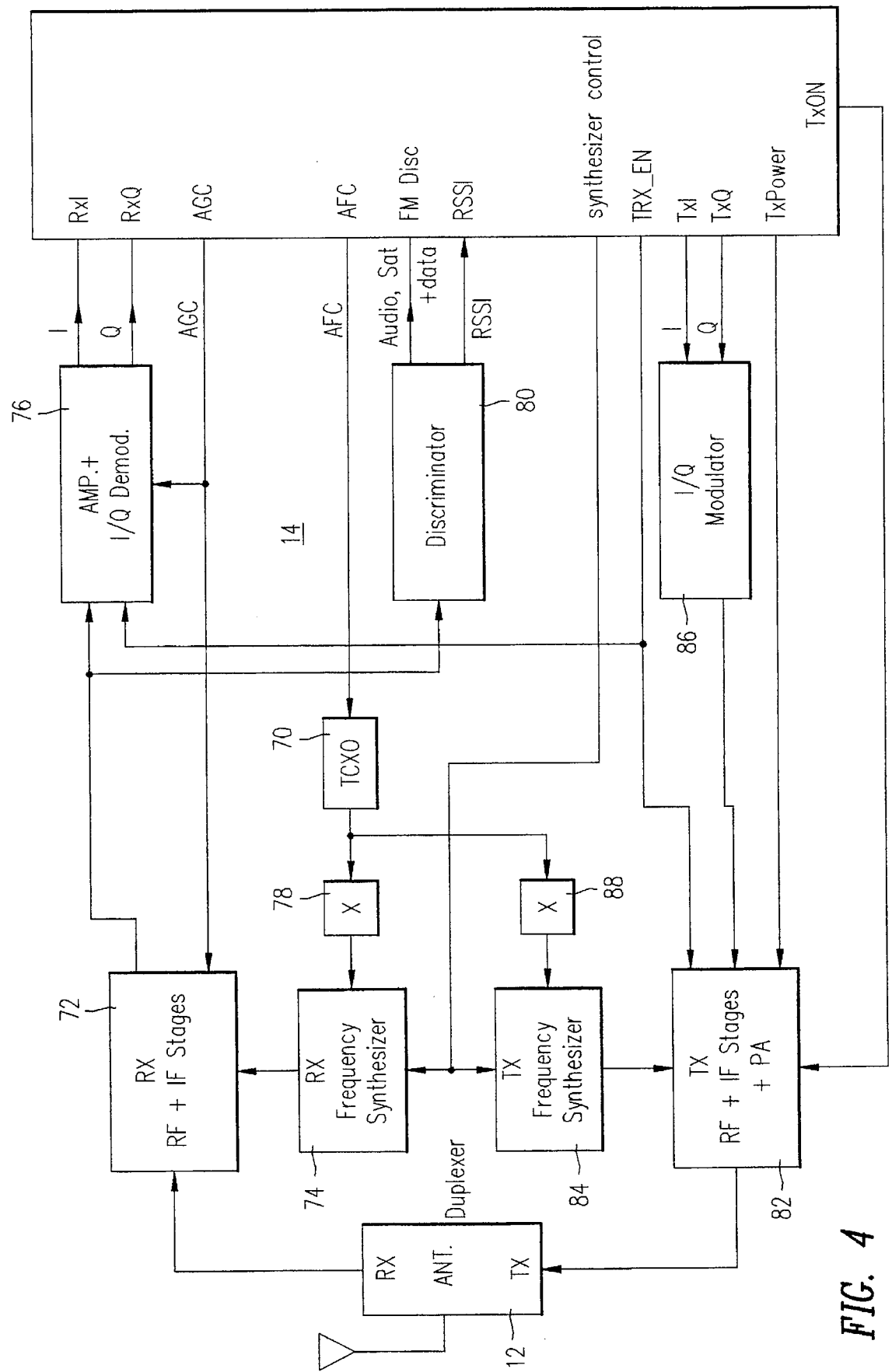
FIG. 4 is a detailed block level diagram of the RF unit portion of the communication unit shown in FIG. 1.

Referring to FIG. 4, there is shown a detailed block level diagram of the RF processing unit 14. The RF processing unit 14 receives the signal from the antenna 12 through a duplexer. The received signal is supplied to an RF+ IF stage 72. The RF+ IF stage 72, as is well known in the art, has an RF filter, low noise amplifier which serves to filter and amplify the received signal, and an RF to IF converter to convert the received RF signal into an intermediate frequency signal. The conversion is based upon a difference frequency signal generated by an RX frequency synthesizer 74. The frequency selected by the RX frequency synthesizer 74 is based upon a signal supplied from a temperature compensated crystal oscillator 70, passing through an appropriate multiplier 78.

The output of the RF+IF stage 72 is then supplied to an amp and I/Q demodulator 76 whose gained is selected by an automatic gain control signal AGC. The outputs of the amp+I/Q demodulator 76 are the analog I and analog Q signals.

In the transmit mode, the RF processing unit 14 comprises similar components as the above. The analog I and analog Q signals are supplied to an I/Q modulator 86, which modulates the analog I,Q signals on an IF carrier signal. The output of the I/Q modulator 86 is then supplied to an RF+IF stage 82. The RF+IF stage 82 converts up the output of the I/Q modulator 86 into an RF signal for transmission by the antenna 12. The frequency to convert from the intermediate frequency to the RF frequency is controlled by the TX frequency synthesizer 84. The TX frequency synthesizer 84 also receives the output of the temperature compensated crystal oscillator 70 multiplied by an appropriate multiplier 88.

Figure 5:
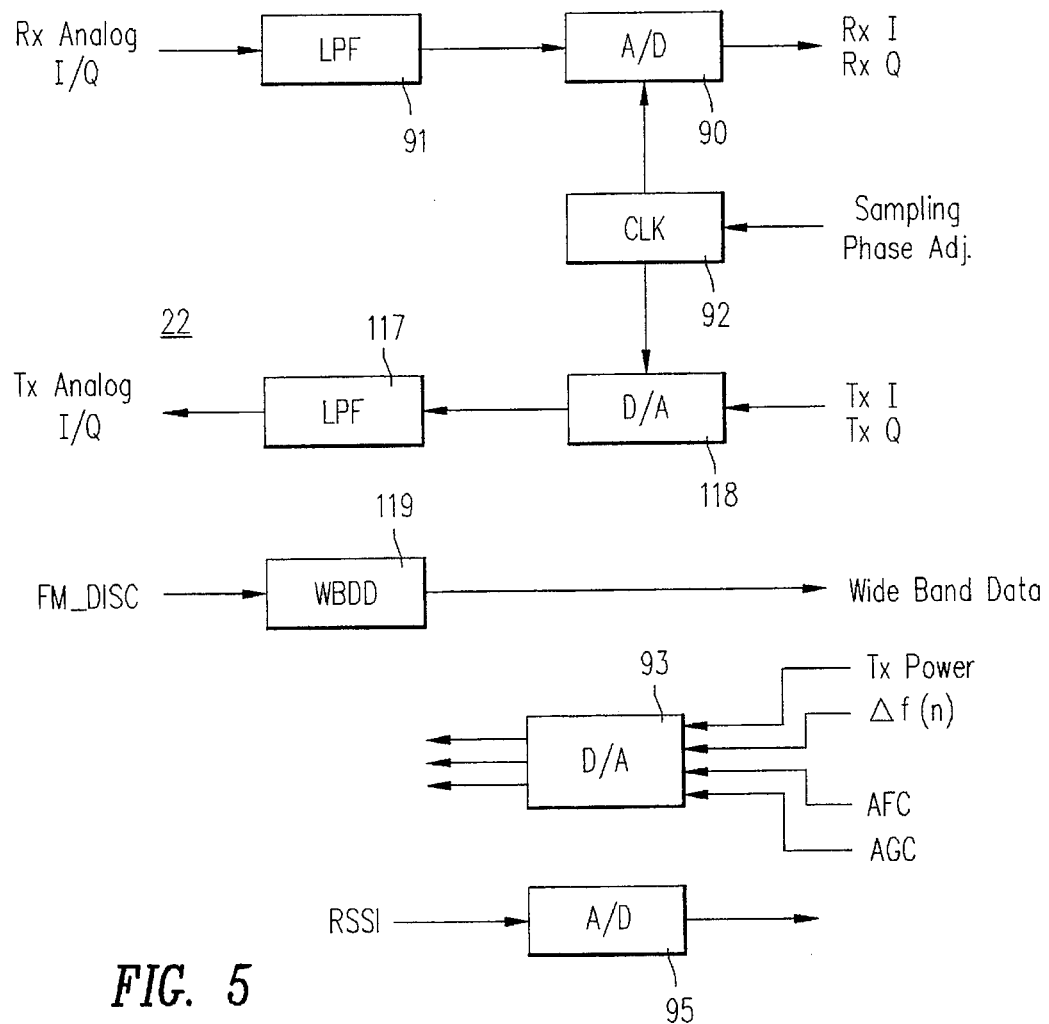
FIG. 5 is a detailed block level diagram of the AFE portion of the communication unit shown in FIG. 1.

Referring to FIG. 5, there is shown a detailed block level diagram of the AFE unit 22. The AFE unit 22 comprises a first LPF (low pass filter) 91. The first LPF 91 receives the received analog I/Q signals from the RF unit 14. The output of the LPF 91 is then supplied to an A-to-D converter 90 from which the digital RxI and the digital RxQ signals are produced. The A-to-D converter 90 also receives a clock signal from a clock 92. The clock 92 is adjusted by a sampling phase adjustment signal (which will be described hereinafter). The AFE unit 22 also comprises a D-to-A converter 118. The D-to-A converter 118 receives the transmit digital I and Q (Tx I/Q) signals and converts them into analog Tx I/Q signals. The D-to-A converter 118 also receives the clock signal from the clock 92. The analog Tx I/Q signals are then supplied to a second LPF 117. The output of the second LPF 117 is then supplied as the Tx analog I/Q signals and are provided to the RF unit 14.

The AFE unit 22 also comprises a WBDD (wide band data demodulator) 119. From the WBDD 119, the signal wide band data is produced. The wide band data demodulator signal is an analog control channel. It is disclosed herein only because the IS-54 standard requires that the communication unit 10 can handle both analog and digital communication. It is not used during digital communication. The AFE unit 22 also comprises a D-to-A converter 93 which receives the control signals of Tx_Power, AFC, and AGC. These digital signals are converted into an analog signal and are supplied to the RF unit 14 to control the RF unit 14. Finally, the AFE unit 22 receives the RSSI (receive signal strength indicator) signal and digitizes it by the A-to-D converter 95.

Figure 6:
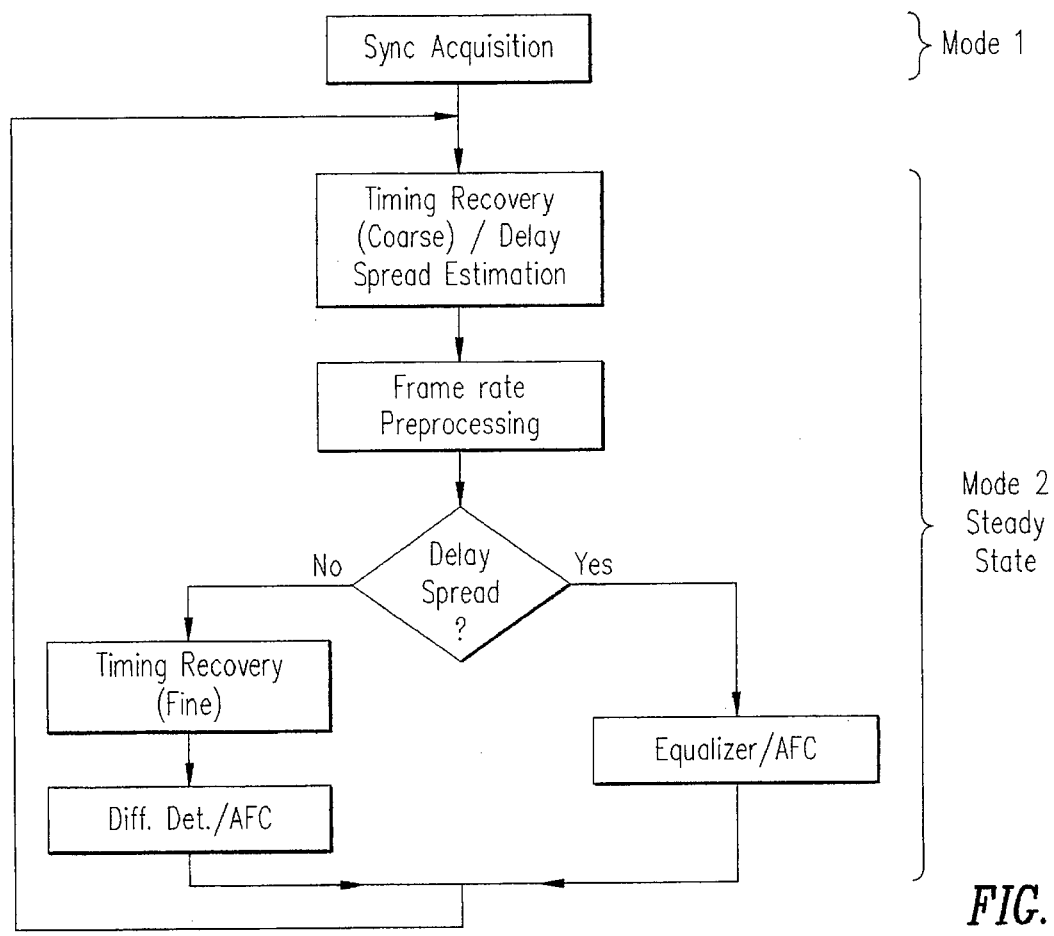
FIG. 6 is a flow chart showing the operation of the software used in the Modem DSP of the communication unit shown in FIG. 1, when the Modem DSP is operating in the receive mode and having two modes of operation: sync acquisition mode and steady state mode.
Figure 9:
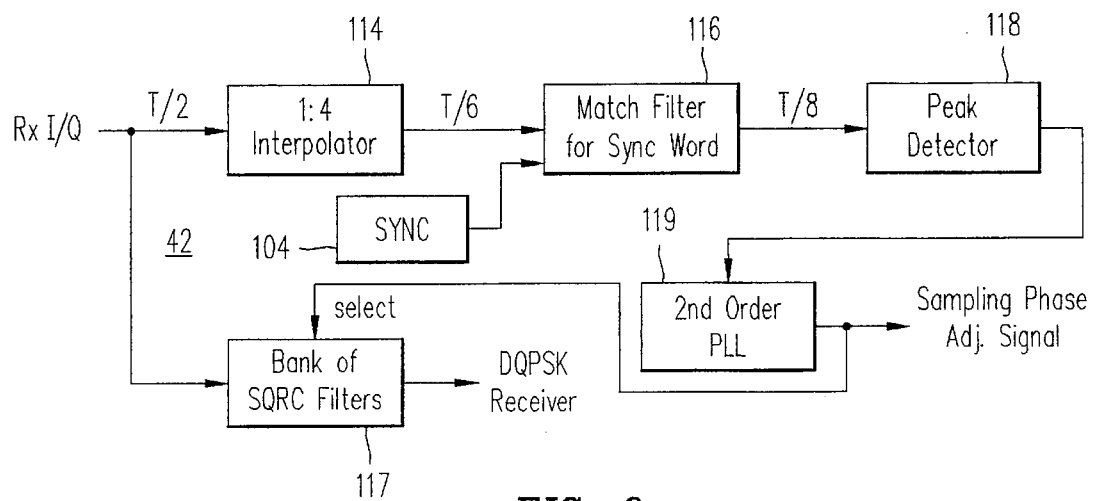
FIG. 9 is a detailed functional block diagram of the timing recovery function during the steady state mode shown in FIG. 8.

Referring to FIG. 6, there is shown a flowchart of the operation of the software used in the Modem DSP 24 when the Modem DSP 24 is operating in the received mode. When operating in the received mode, the Modem DSP 24 has two modes of operation: a sync acquisition mode, and a steady state mode. In the sync acquisition mode, the operation occurs at the start of each communication session. Once communication has been established, the software proceeds into the steady state mode. There, the operation occurs once every frame or once every 20 millisec. Further, during the steady state, the Modem DSP 24 initially performs a timing recovery operation 42 which is shown in FIG. 9 and which will be explained in greater detail. After the timing recovery operation 42, the Modem DSP 24 operates on the signal shown in block level diagram form in FIG. 10 and will be discussed in greater detail hereinafter.

Figure 7:
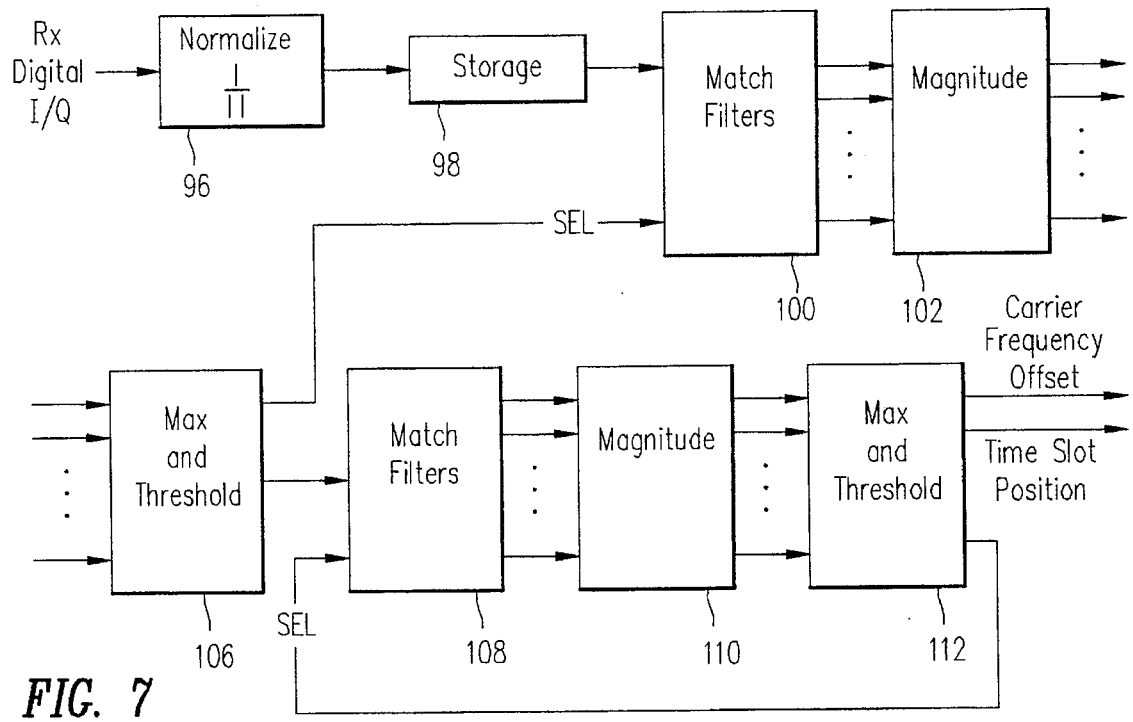
FIG. 7 is a functional block diagram of the Modem DSP with its software, operating in the sync acquisition mode.

Referring to FIG. 7, there is shown a detailed functional block diagram of the sync acquisition mode of operation for the Modem DSP 24. The digital I/Q received signals from the AFE unit 22 are supplied to a normalizing circuit 96. The normalizing circuit 96 serves to normalize the magnitude or the amplitude of the digitized I,Q signals from the A to D converter 90.

From the normalizing circuit 96, the digitally encoded signal is then stored in a storage unit 98, which is just a buffer. As will be explained hereinafter, the storage 98 stores at least 15 symbols (or 30 samples) which is the length of the synchronization signal portion of the digitized signal. The stored signals are then supplied to a first bank of match filters 100. Each of the filters in the first bank 100 is adapted to receive the digital signal from the storage 98 and to filter this digital signal through a frequency range different from one another. Thus, the output of the first bank of match filters 100 is a plurality of filtered digital signals. The plurality of filtered digital signals are supplied to a plurality of first magnitude circuits 102. Each of the plurality of first magnitude circuits 102 determines the magnitude of the filtered digital signal from the first bank of match filters 100. The output of the first magnitude circuits 102 is yet another plurality of digital signals which are supplied to a first maximum and threshold circuit detector 106.

The output of the first maximum and threshold circuit detector 106 serves to detect the filtered digital signal having the maximum magnitude. In addition, the first maximum and threshold circuit 106 selects the match filter from the first bank of matched filters 100 that generated the signal having the maximum output.

The output of the first maximum and threshold circuit 106 is supplied to a second bank of match filters 108. Each of the filters in the second bank of match filters 108 has a fine frequency offset from one another and having a different filter coefficients from one another. The output of the second bank of match filters 108 is a plurality of fine filtered digital signals which are supplied to a second magnitude circuit 110.

The second magnitude circuit 110, similar to the first magnitude circuit 102, comprises a plurality of circuits each of which receives a fine filtered digital signal and determines the amplitude or the magnitude thereof. The output of the second magnitude circuit 110 is a plurality of signals which are supplied to a second maximum and threshold circuit detector 112. The second maximum and threshold detector 112 selects the digital signal having the maximum amplitude as the output thereof. In addition, the second maximum and threshold circuit 112 selects the filter from the second bank of match filters 108, producing that output. Finally, the output of the second maximum and threshold circuit 112 is an initial carrier frequency offset signal to correct the carrier frequency to the AFC (automatic frequency control), and a time slot position signal. The time slot position signal is used internally to control the start and stop of each subsequent frame.

Figure 8:
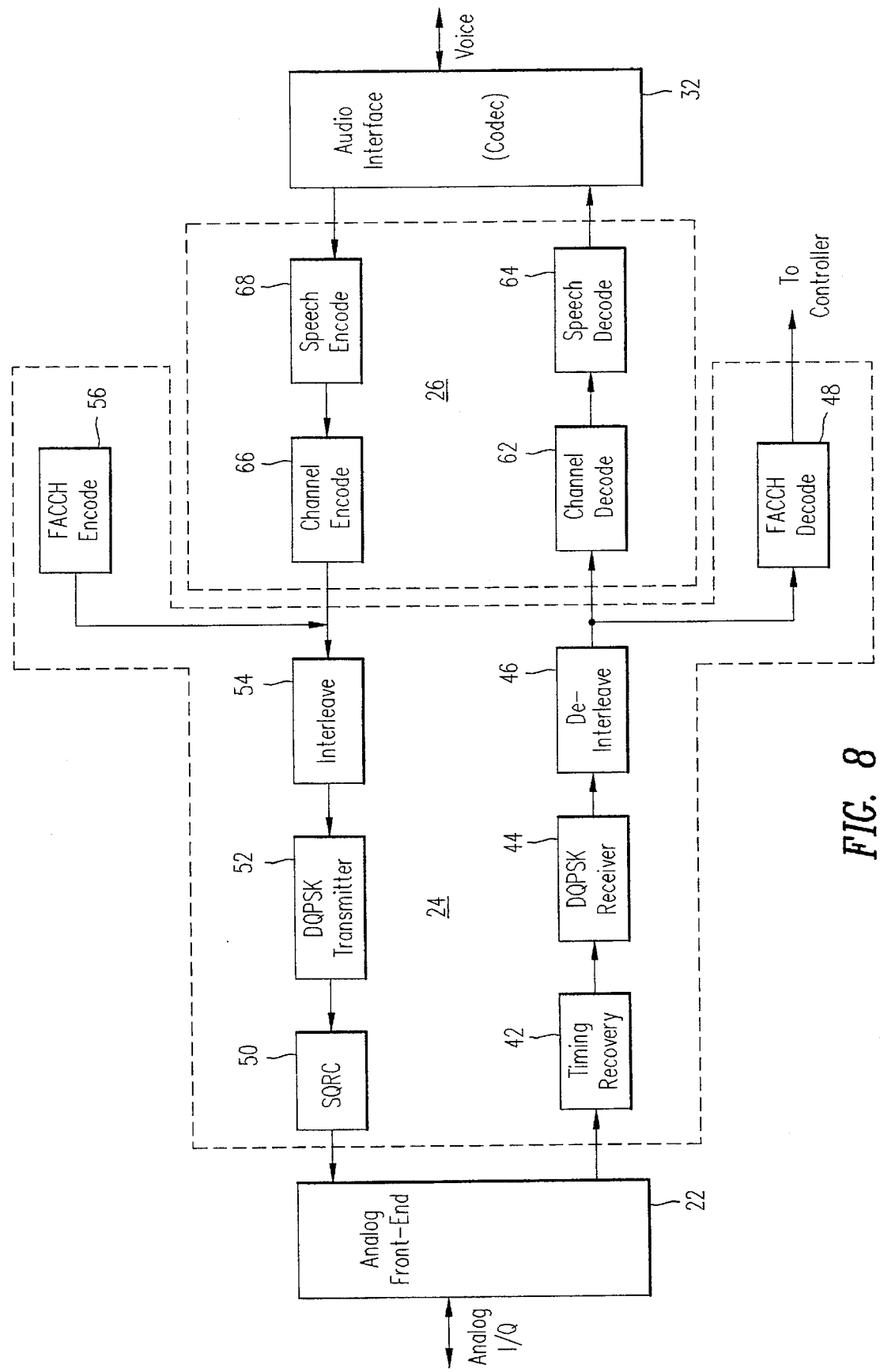
FIG. 8 is a functional block diagram of the Modem DSP with its software, operating in the steady state mode

Referring to FIG. 8, there is shown a block level functional diagram of the operation of the Modem DSP 24 with the software therein when operating in the steady state mode. In the steady state mode, the Modem DSP 24 performs SQRC filtering function 42 and 50 (for receive and transmit) and timing recovery 42 (for receive), DQPSK modulation 44 and 52 (again receive and transmit respectively) and frame interleaving/De-interleaving 46 and 54 (receive and transmit respectfully), and FACCH decode and encode 48 and 56 (receive and transmit respective). In addition, the VSELP DSP 26 performs channel decode and encoding 62 and 66 (receive and transmit, respectively) and speech decode and encode 64 and 68 (receive and transmit respectively).

Referring to FIG. 9, there is shown a detailed block level functional diagram of the timing recovery function 42 performed by the Modem DSP 24 when operating in the steady state mode.

The Rx I/Q signals from the second maximum and threshold circuit detector 112 are supplied to a 1:4 interpolator 114. The output of the interpolator 114 is then supplied to a third match filter 116. The match filter 116 also receives the stored sync signal from a storage location 104. The match filter 116 is a single filter and it matches each input sample symbol with the stored sync signal from the storage location 104. After each match, the input signal is shifted by T/8, or by one input sample and then is matched again with the sync signal from the storage location 104. Thus, the output of the match filter 116 is a signal operating at the T/8 rate. The outputs of the match filter 116 are then supplied to a peak detector 151. The peak detector 151 receives the plurality of outputs from the match filter 116, being supplied thereto at the T/8 rate, and determines the output having the highest peak value. The output of the peak detector 151 is the value imax, the use of which will be discussed hereinafter. The output from the peak detector 151 is then supplied to a second order phase lock loop 152. The second order phase lock loop 152 has an internal variable AVG-POS, the use of which will be described hereinafter in greater detail. The output of the second order phase lock loop 152 is the sampling phase adjustment signal which is supplied to the clock 92 of the AFE 22 shown in FIG. 5. The received digital Rx I/Q signals at the T/2 rate are also supplied to a bank of SQRC filters 150. The output of the second order PLL 152 is used to select the appropriate SQRC filter from the bank of SQRC filters 150. The output of the bank of SQRC filters 150 is then supplied to the DQPSK receiver 44.

The output of the second order PLL 152 is the signal Avg-pos(n+1). It is supplied to the AFE unit 22 and is adjusted once every frame during the idle period. The coefficient filter of each of the bank of SQRC filters 150 is tuned to a different sampling phase adjustment. Thus, the output of the second order PLL 152 selects one of the coefficient filters from the bank of SQRC filters 150.

Figure 10:
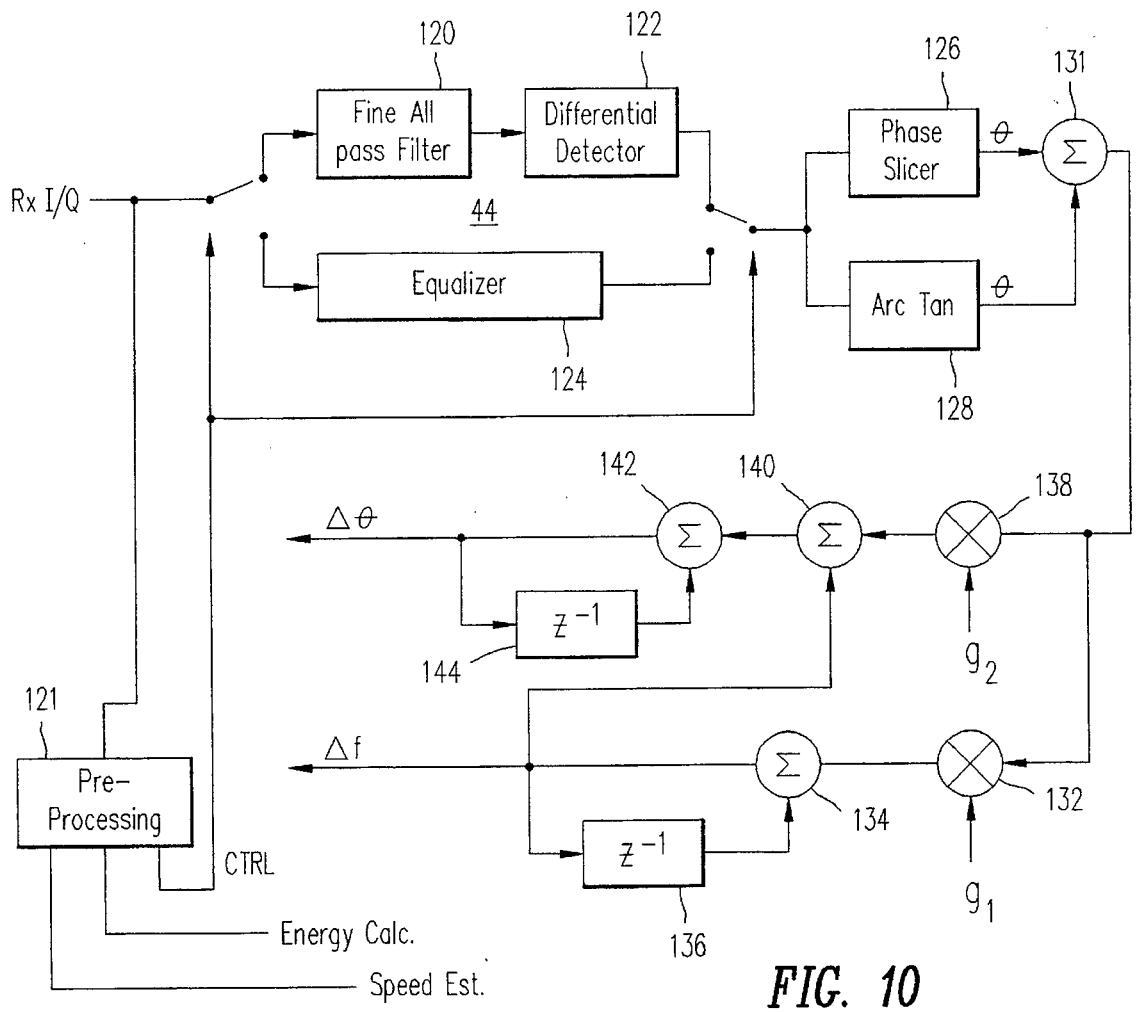
FIG. 10 is a detailed functional block diagram of the DQPSK receiver function during the steady state mode shown in FIG. 8.

Referring to FIG. 10 there is shown a detailed block level diagram of a portion of the DQPSK receiver 44. The DQPSK receiver 44 receives each symbol as the output of the timing recovery function 42. The digital Rx I/Q symbols are supplied to a pre-processing unit 121 which generates the control signals: speed estimation, energy calculation, and CTRL. The CTRL signal controls the DQPSK receiver 44 in its two modes of operation. In one mode, each symbol from the output of the timing recovery 42 is supplied to a fine all pass filter 120. From the fine all pass filter 120, each symbol signal is supplied to a differential detector 122. From the differential detector 122, the symbol signal is then supplied to a phase slicer 126 and an arc tangent processor 128.

In another mode of operation, each symbol from the timing recovery function 42 is supplied to an equalizer 124. The equalizer 124 operates on all the symbols received during the assigned time slot. After the equalizer 124 has performed its operation (to be discussed hereinafter), each symbol is outputted from the equalizer 124, one at a time. Each symbol signal from the equalizer 124 is also supplied to the phase slicer 126 and at the same time to the arc tangent processor 128.

Each of the symbol signal from the equalizer 124 or the differential detector 122 is received simultaneously by the phase slicer 126 and the arc tangent processor 128. The phase slicer 126 operates upon the symbol signal by quantizing the input phase into one of a plurality of pre-determined constellation points (i e. 45°, 135°, 225°, 315°) and generates the phase signal $\ominus$. The arc tangent processor 128 receives the same symbol signal and serves to operate on the symbol signal received to determine the arc tangent of its phase. The output of the arc tangent processor 128 is the phase signal $\ominus$. The phase signal $\ominus$ and the phase signal $\ominus$ are supplied to a first subtractor (or adder with a negative input) 130 which generates the phase error signal ($\ominus$–$\ominus$). The phase error signal ($\ominus$–$\ominus$) is then supplied to a first multiplier 132 to which a constant $g_1$ is multiplied. Thereafter, the output of the first multiplier 132 is supplied to a second adder 134 to which the frequency signal output from a prior operation on a prior symbol was stored in the storage 136. From the second adder 134, the adjustment to the frequency to the next symbol or the frequency error signal, is then generated. Thus, the frequency error signal which is generated is in accordance with:

$$\Delta f(n+1) = \Delta f(n) + g_1(\ominus(n) - \ominus(n));$$

The output of the first adder 130 is also supplied to a second multiplier 138 to which the constant $g_2$ is supplied. The output of the second multiplier 138 is then supplied to a third adder 140 to which the frequency error signal $\Delta f(n)$ from a prior symbol is also supplied. The output of the third adder 140 is supplied to a fourth adder 142 to which the carrier phase $\phi$ signal from a prior bit has been supplied and stored in storage 144. The output of the fourth adder 142 is a carrier phase error signal and is calculated in accordance with:

$$\phi(n+1)=\phi(n)+g_2(\Theta(n)-\ominus(n))+\Delta f(n)$$

Operation

I. Initial Determination of Frequency and Time Slot Position

As previously discussed, the digital wireless communication unit 10 is particular adapted for digital cellular communication wherein errors such as rayleigh fading, intersymbol interference and carrier frequency offset present problems. At the commencement of each communication session, the remote unit and the base unit must necessarily establish initial frequency and time slot position.

Referring to FIG. 7, after the IQ signals are digitized by the analog to digital converter 90, they are normalized by the normalizing unit 96 to retain only the phase information. The digitized I,Q samples are then stored in a storage unit 98 or a delay line of size of 30 complex. The size is chosen because the storage unit 98 or the delay line must contain 14 phase changes for the sync word, which is 15 symbols or 30 samples at T/2 sampling rate.

The output of the storage unit 98 is supplied to a first bank 100 of 6 matched filters consisting of six 15-TAP FIR complex filters. Each one is matched to the same sync word but with a different carrier frequency offset. The range of offset is designed to cover the plus or minus 2.5 ppm offset of an 850 MHz carrier or an offset of about 1900 Hz. Even though each of the filters has 15 symbols spaced taps, odd and even samples from the delay line 98 are alternately entered into each of the match filters so that T/2 resolution is maintained. Thus, the output of each match filter is an output also at the T/2 rate.

Each of the match filters of the first bank 100 is matched to the carrier phase shifted versions of the sync word symbols-not the phase changes from symbol to symbol. By not using the phase changes from symbol to symbol, this would obviate the requirement that the delay line 98 or the storage 98 contain phase changes themselves. In the preferred embodiment, each of the match filters from the first bank 100 has a center of frequency offset covering the 2.5 ppm 1900 Hz range of possible frequency offsets as shown below.

```
-1900 -1566 -938 -315  0 +315 +938 +1566 +1900
  |     |    |    |   |   |    |     |     |
  F1    F2   F3   F4      F5   F6
``` with $F_1$-$F_6$ being the center frequency of six 15-TAP FIR filters.

Each of the match filters from the first bank 100 simultaneously provides frequency offset estimate, start of frame, and time slot and symbol timing to within T/2 accuracy. If a particular match filter of the first bank 100 matches a particular sync word, then there will be a high output when the contents of the storage 98 are exactly aligned with the sync word and low output for any other alignment. Thus, the match filters from the first bank 100 provide a good indication of frame, slot and symbol timing to within one T/2 sample.

When there is some frequency offset, because there is a plurality or a bank 100 of match filters, the detection range of a particular offset can be found empirically to be about ±11 degree, i.e., each match filter has high output only when the match filter's offset matches the signal's offset within this range. By using the first bank match filters 100, both sync and frequency offset estimation can be performed simultaneously.

Once the match filter producing the largest amplitude is detected and is chosen, i.e., that match filter from the first bank 100 has the exact or the closest offset to the frequency, then it is supplied to a second bank 108 of match filters. The second bank 108 of match filters is a bank of 4 fine match filters each spaced 126 Hz apart. The output of the first maximum and threshold circuit detector 106 or the coarse frequency estimate is used to find the center frequency. The received sync word samples are then digitally rotated by this estimate to bring them down to near the baseband. The rotated sync samples are then run through the second bank 108 comprising of 4 fine match filters. The filter with the highest output from the five filters (including the one which gave the coarse estimate) determines the final fine frequency offset estimate. The final frequency offset estimate should be accurate to within 0.9 degrees or 63 Hz.

In a preferred embodiment, the centers of the match filters for the second bank 108 are offset to the plus and minus of the center frequency from the coarse estimate. In addition, the time slot position is precise up to T/2 because the filters from the first bank 100 are precise up to T/2.

The use of two banks 100 and 108 of match filters to initially set the coarse center frequency and then to adjust the fine frequency permits rapid frequency acquisition without using expensive processing capability.

II. Adaptive Frequency Control

Once the initial frequency has been set, due to the mobility of the remote unit, frequency offset, such as drift, can occur during the communication session. Thus, the communication unit 10 must adaptively control the frequency during the communication session.

Referring to FIG. 10 there is shown a portion of the DQPSK receiver 44. As previously discussed, the symbol signal from the output of the differential detector 122 or from the output of the equalizer 124 is supplied to both the phase slicer 126 and the arc tangent processor 128. The phase slicer 126 generates the phase signal $\Theta(n)$. The arc tangent processor 128 generates the phase signal $\ominus(n)$. The output of the phase slicer processor 126 and the arc tangent processor 128 are supplied to a first adder 130 which computes the phase error signal as previously discussed.

The frequency error signal $\Delta f(n)$ is computed as previously discussed.

The constant $g_1$ is $2^{-11}$ during sync acquisition and is $2^{-13}$ in a steady state mode.

In addition, the carrier phase error signal $\phi(n+1)$ is calculated as follows:

$$\phi(n+1)=\phi(n)+g_2(\Theta(n)-\ominus(n))+\Delta f(n)$$

The constant $g_2$ is $2^{-7}$ during the sync acquisition and $2^{-8}$ in a steady state mode.

Both equations are updated every symbol. Thus, (n) is the symbol index. The frequency error signal $\Delta f(n)$ is supplied to the digital to analog converter 93 and is used to control the temperature compensated crystal oscillator 70. The adjustment based upon frequency error signal is performed once after the assigned time slot in question i.e., during the idle slot and does not affect the received sample until the beginning of the next frame. During the interrupt, the higher order 10 bits of $\Delta f$ are used for AFE correction and this number is subtracted from $\Delta f$ so that $\Delta f$ keeps a running total of only the residual frequency offset.

The carrier phase error signal is also calculated as shown above. The carrier phase error signal (different from sampling phase error signal) is used to adjust the carrier phase of the frequency. It is corrected in the following manner:

$$e^{-j\phi}$$

and is applied to the I/Q signals from the demodulator 76 shown in FIG. 4. In the preferred embodiment, it is calculated only in the beginning of the communication session. However, as can be seen, this calculation, like the calculation for the frequency error signal Δf, can be adjusted every frame, or even every symbol.

III. Adaptive Sampling Phase Control

Similar to the adaptive frequency control, sampling phase during the operation of the communication session must also be adaptively controlled. Referring to FIG. 9, the received I/Q samples around the sync word are passed to an interpolator 114. The interpolator 114 generates 8×T samples (the input to the interpolator 114 is already at 2T rate). The output of the interpolator 114 is match filtered by the filter 116 with an ideal sync word stored from the storage 104 at T sampling rate. Although the acquisition mode has already determined timing to within T/2 sampling phase, by interpolating at 4× the input rate, in theory, the match filter 116 must only determine within a plus or minus four sample range. Four samples at 8XT sampling rate means the search window is T/2. However, due to delay spread, the detected peak may belong to the delayed path, hence its timing may be the delayed version of ideal timing. In fact, it is possible that the main signal may not be the largest. Thus, in order to determine the largest, i.e., maximum amplitude peak, the search is extended over minus 1 and plus 2 symbols of the expected symbol or minus 8 to plus 16 sample range.

The sampling phase adjustment signal, which is the output of the second order PLL 152 is used to adjust the sampling phase, which is computed in a second order timing recovery loop. The sampling phase is adjusted after the completion of the assigned time slot and prior to the commencement of the next frame. Thus, the sampling phase adjustment occurs during the idle time slot. The purpose of using a second order rather than first is to minimize jitter of the correction. Instant sampling phase correction or first order timing correction can cause a jitter. In addition, the first order timing phase error is corrected by choosing the best matched filters from the bank of match filters 108 for each frame. The frequency offset from frame to frame is adjusted as previously discussed.

The timing recovery update equations are $$\text{drift}(n+1) = \text{drift}(n) + \beta \lfloor \text{imax}(n) - \text{avg-pos}(n) \rfloor$$

$$\text{avg-pos}(n+1) = \text{avg-pos}(n) + \lfloor \text{imax}(n) - \text{avg-pos}(n) \rfloor + \text{drift}(n+1)$$

where n is the frame count, imax(n) is the peak position of matched filter output for frame n, $\beta = 2^{-6}$ for the first 100 frames, $\beta = 2^{-7}$ for the next 100 frames, and $\beta = 2^{-8}$ after 200 frames.

The adjustment of the sampling phase depends upon whether the argument inside $\lfloor . \rfloor$ is negative argument (in which case the unit 10 should advance timing, sample should be sooner) or is positive argument (in which case the unit 10 should retard timing, the samples being later). For negative argument, i.e. avg-pos(n)>imax(n), the timing adjustment in the preferred embodiment should be limited by:

$$-3 \times \frac{T}{8} \text{ for } n < 100 \qquad a.$$

$$-1.25 \times \frac{T}{8} \text{ for } 100 \leq n < 200 \qquad b.$$

$$-.5 \times \frac{T}{8} \text{ for } n \geq 200 \qquad c.$$

For positive argument, i.e. avg-pos(n)<imax(n), the timing adjustment in the preferred embodiment should be limited by $$.5 \times \frac{T}{8} \text{ for } n < 100 \qquad a.$$

$$.15 \times \frac{T}{8} \text{ for } 100 \leq n < 200 \qquad b.$$

$$.0667 \times \frac{T}{8} \text{ for } n \geq 200 \qquad c.$$

As can be seen from the above, the advance magnitude is larger than the retard magnitude so that the equations are biased towards moving to the first ray, which implies earlier sampling. There is more bias in the advance magnitude because that is more likely the source of the no-delay signal path, whereas the retard direction is more likely the source of the delay path.

The sampling time for the current frame is determined by picking the SQRC filter closest to avg-pos. The sampling clock 92 is corrected by the amount avg-pos(n+1) but is limited by T/8. In practice, because the base station's clock accuracy is 5 ppm and the remote unit is 100 ppm, the correction is never even as large as T/8.

In the case where the signals are passed through another bank of fine pass filters 120 in FIG. 10, where another digital fine timing correction is performed. Each of the fine all pass filters is a complex T/2 spaced 4 tap FIR filter. The bank of the coarse filters from the maximum and threshold detector 112 along with the timing recovery equations determine timing for the current frame to an accuracy of T/8. Finer accuracy T/32 is obtained by using one of five fine all pass filter 120 spaced 11.25 degrees apart. The correct filter is determined by the residual value of avg-pos after choosing the coarse all pass filter. The fine filter centers are:

−22.5 −11.25 0 +11.25 +22.5

IV. Estimation of Speed for Equalization

To determine the optimum parameter values for equalization using RLS adaptation techniques, vehicles speed estimation is necessary. Vehicle speed can be roughly estimated from the slope of the received signal amplitude.

Figure 12:
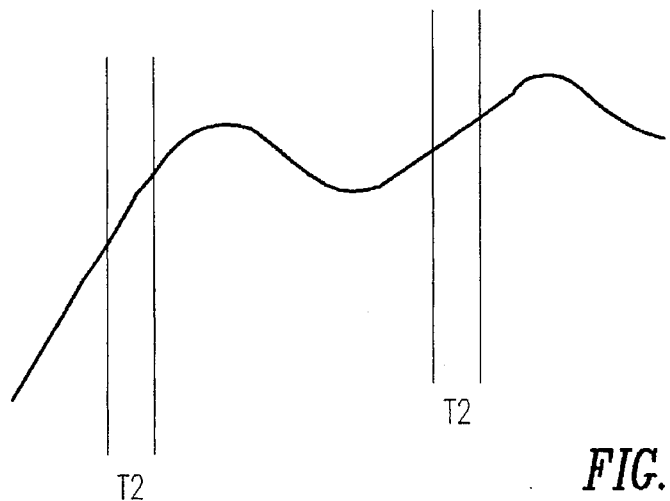
FIG. 12 is a diagram showing the difference in energy of a signal received by a mobile unit when moving.

Referring to FIG. 12 there is shown a graph of the amplitude of transmission by a moving vehicle (or reception by the moving vehicle) of a signal generated by the other. As can be seen, the slope of the amplitude is indicative of the speed of the mobile unit. In general, the information required is very coarse, e.g., slow, medium or fast. Thus, accuracy is not critical. At higher speeds fades occur more rapidly so the slopes are greater.

The slope is estimated by measuring the difference between short term energies of a plurality of contiguous symbols. The short term energy E(k) is averaged over 8 contiguous samples. Since there are 162 symbols in a time slot plus 14 symbols of the sync field of an adjacent time slot, there are a total of 176 symbols. The 176 symbols are processed at T/2 rate. Thus there are 352 (T/2) samples. With eight samples per short term average, there are 44 short term average samples. The slope estimation updated equation is $$\text{diff} = \frac{1}{150} \sum_{k=0}^{29} \left| \sum_{n=0}^{4} E(n+k) - \sum_{n=0}^{4} E(n+k+10) \right|$$

$$\text{where } E(k) = \frac{1}{8} \sum_{n=0}^{7} \text{Mag}(8K+n)$$

Figure 13:
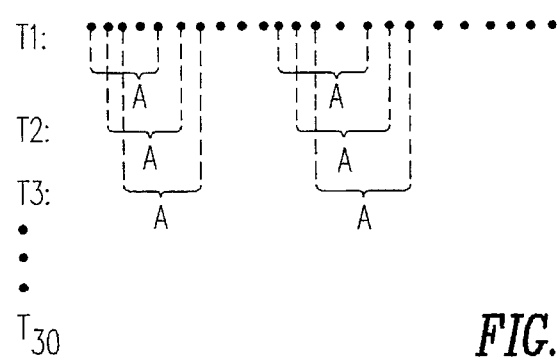
FIG. 13 is a block level diagram showing the measurement of energy in a time slot to estimate the speed of a mobile unit.

As can be seen in FIG. 13, the average energy of groups of five contiguous short term energy E(k) is taken. A second group is separated from a first group by five short term energy points. The magnitude of the difference between the first group and the second group is computed. This process is repeated 30 times by shifting the groups by one short term energy point each time. Further smoothing can be achieved by the equation $$\text{Diff}_{Ave} = \alpha \times \text{Diff}_{Ave} + (1-\alpha) \times \text{Diff}$$

where $\alpha$ is a smoothing constant.

As a result of the calculation of Diff or slope, an estimation of the speed of the mobile unit can be made.

V. Equalization

As previously discussed, when inter symbol interference occurs, equalization must be performed. In this method, all of the digital signals from the assigned time slot, including the sync digital signals, the data signals, and the sync signals of an immediately succeeding time slot (not assigned to the communication unit 10) are stored (162 symbols of the assigned time slot +14 symbols of sync of adjacent time slot). Thus, there are a total of 176 symbols stored. Further, as previously discussed, the sync symbols comprise the first 14 symbols of each time slot with the DVCC marker signal being 6 in number and being located at symbols 85–91.

Figure 14A:
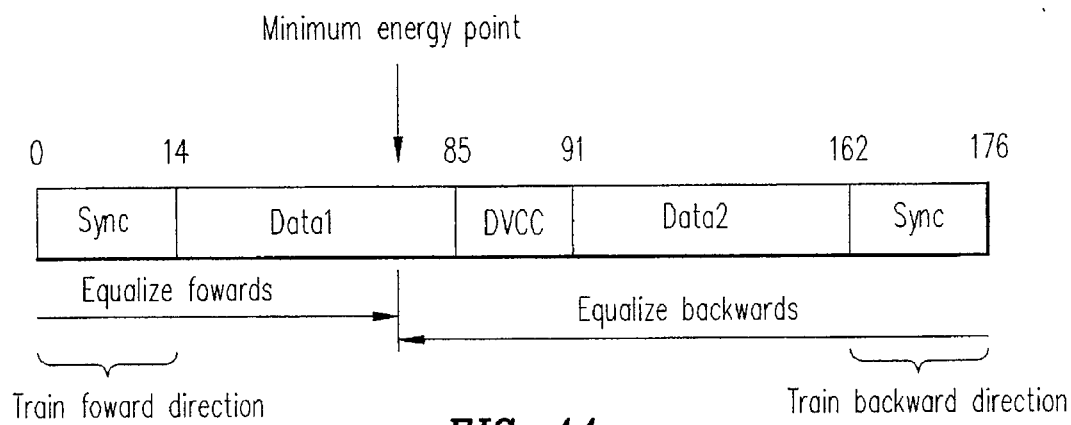
FIGS. 14a–14c are diagrams showing the methods of training an equalizer.

The performance of equalization can be improved significantly by doing equalization bi-directionally. First, one minimum energy point is located in the assigned time slot (as shown in Figure 14(a)), then the RLS equalizer is trained by progressing forward from the commencement of the sync signal of the assigned time slot until the minimum energy point and progressing backward from the end of the sync signal of the succeeding, non-assigned time slot, until the minimum energy point is reached.

Figure 14B:
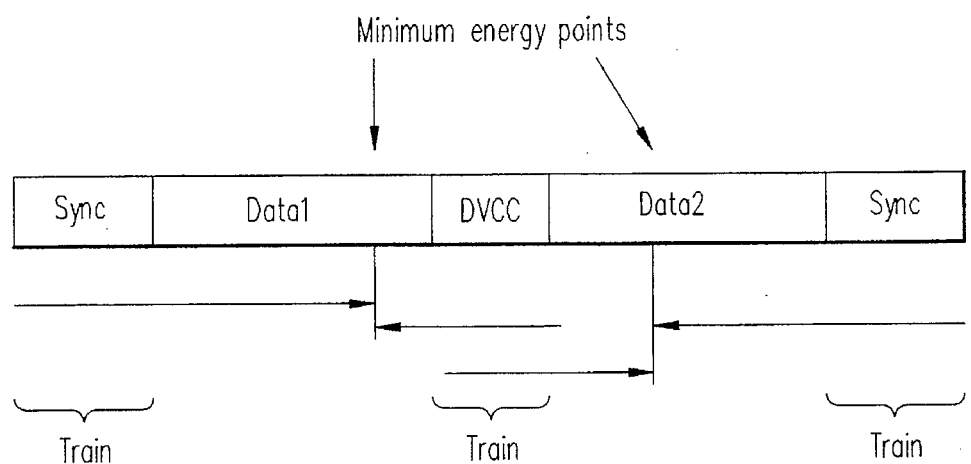

The performance of equalization can be further improved by making use of the DVCC signal as a training sequence. In so doing, two minimum energy points (one in data1 field and one in data2 field) are detected, as shown in FIG. 14(b). Then the RLS equalizer is trained by progressing forward from the commencement of the sync signal of the assigned time slot until the first minimum energy point is reached. The RLS equalizer is trained by progressing backwards from the DVCC marker signal until the first minimum energy point is reached. The RLS equalizer is then trained by progressing forward from the DVCC marker into the data2 field, until the second minimum energy point is reached. Finally, the RLS equalizer is trained by progressing backward from the end of the sync signal of the succeeding, non-assigned time slot backward to the second minimum energy point.

Figure 14C:
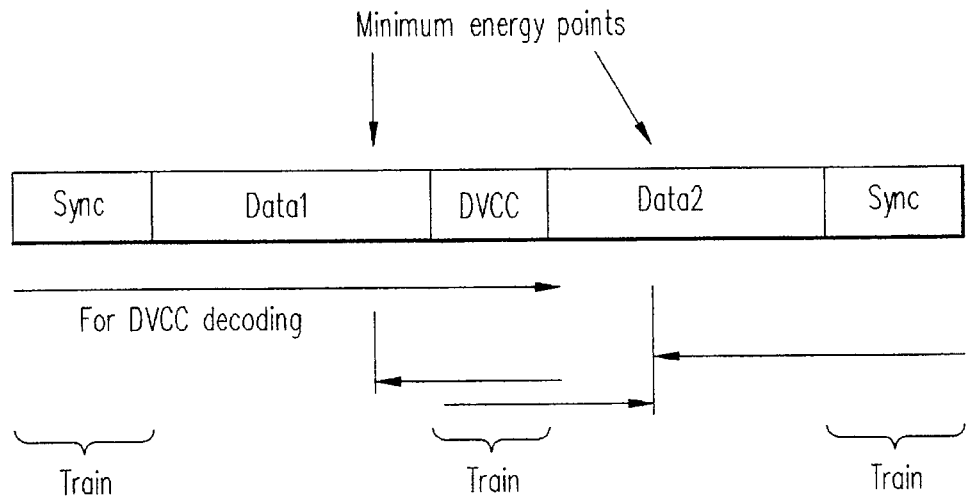

Finally, if it is desired to decode the DVCC marker signals, the RLS equalizer can be trained by first progressing forward from the sync signal until the DVCC marker is encountered. There, the DVCC marker signal is decoded and the RLS equalizer is trained by progressing backwards from the DVCC marker into the first data field, data1, until the first minimum energy point is reached. This is shown in FIG. 14(c).

As a further refinement on the above method, the minimum energy point detected can be compared to a threshold level. If the minimum energy point is above the threshold level, then the RLS equalizer proceeds as if there is no minimum energy point. In that event, the RLS equalizer is trained starting with sync of the assigned time slot proceeding through the data1 field, through the DVCC marker signal, and through the data2 field.

What is claimed is:

1. An apparatus for receiving a digitally encoded signal transmitted wirelessly in a plurality of non-contiguous time slots by a first unit, said apparatus comprising:

antenna means for receiving said digitally encoded signal;

converting means, coupled to said antenna means, for converting the received digitally encoded signal, to a lower frequency;

sampling means for receiving the converted received digitally encoded signal at said lower frequency and for generating a plurality of discrete binary symbols during one of said plurality of non-contiguous time slots;

determining means for receiving each one of said plurality of discrete binary symbols (n) and for determining a phase error signal thereof and for generating a frequency error signal for the discrete binary symbol (n+1), subsequent to said one discrete binary symbol (n), in accordance with $$\Delta f(n+1) = \Delta f(n) + g_1(\Theta(n) - \Theta(n))$$

where $g_1$ is a constant, $(\Theta(n) - \Theta(n))$ is said phase error signal for the nth symbol, $\Delta f(n)$ is the frequency error signal for the nth symbol, and $\Delta f(n+1)$ is the frequency error signal for the n+1 symbol; and means for controlling said converting means in response to said frequency error signal after said one of said plurality of non-contiguous time slots but prior to the commencement of a non-contiguous time slot, subsequent thereto.

2. The apparatus of claim 1 wherein said digitally encoded signal in each of said non-contiguous time slots comprises synchronization signal followed by data signal.

3. The apparatus of claim 2 wherein said $g_1 = 2^{-11}$ during a sync acquisition mode, and $g_1 = 2^{-13}$ during a steady state mode.

4. The apparatus of claim 1 further comprising digital to analog converting means for receiving said frequency error signal and for converting it into an analog signal, supplied to said controlling means.

5. The apparatus of claim 1 wherein said determining means comprises:

first means for processing said plurality of discrete binary symbols;

second means for processing said plurality of discrete binary symbols by equalization; and means for activating either said first or said second processing means.

6. The apparatus of claim 5 wherein said first processing means comprises:

fine pass filter means for receiving said plurality of discrete binary symbols and for filtering each symbol; and differential detector means for receiving each filtered symbol and for generating an output symbol.

7. The apparatus of claim 6 wherein said second processing means comprises:

equalizer means for correcting interference between each of said plurality of discrete binary symbols, and for generating an output symbol one at a time.

8. The apparatus of claim 7 wherein said determining means further comprises:

phase slicer means for receiving said output symbol (n) and for generating a first phase signal $\Theta(n)$;

arc tangent means for receiving said output symbol (n) and for generating a second phase signal $\Theta(n)$; and means for receiving the first phase signal $\Theta(n)$ and the second phase signal $\Theta(n)$ and for generating the phase error signal.

9. A method of operating a first unit for adjusting the carrier frequency received by said first unit in a wireless digital communication system operating between said first unit and a second unit wherein said second unit transmits a digitally encoded signal in a plurality of non-contiguous time slots to said first unit, said method comprising:

receiving said digitally encoded signal by said first unit;

converting the received digitally encoded signal to a lower frequency;

sampling said lower frequency received digitally encoded signal, during one of said plurality of non-contiguous time slots, to produce a plurality of discrete binary symbols;

storing said plurality of discrete binary symbols;

determining a phase error signal associated with one symbol (n) from said plurality of discrete binary symbols;

generating a frequency error signal for the symbol (n+1), subsequent to said one symbol (n), in accordance with $$\Delta f(n+1)=\Delta f(n)+g_1(\Theta(n)-\Theta(n))$$

where $g_1$ is a constant, $(\Theta(n)-\Theta(n))$ is said phase error signal for the nth symbol, $\Delta f(n)$ is the frequency error signal for the nth symbol, and $\Delta f(n+1)$ is the frequency error signal for the n+1 symbol; and adjusting said lower frequency in response to said frequency error signal after said one of said plurality of non-contiguous time slots but prior to a non-contiguous time slot subsequent thereto.

10. The method of claim 9 wherein said digitally encoded signal in each of said non-contiguous time slots comprises synchronization signal followed by data signal.

11. The method of claim 10 wherein said $g_1=2^{-11}$ during a sync acquisition mode, and $g_1=2^{-13}$ during a steady state mode.

12. The method of claim 9 further comprising:

converting the frequency error signal into an analog frequency error signal; and adjusting said lower frequency in response to said analog frequency error signal.

13. The method of claim 9 wherein the determining step comprises:

processing said plurality of discrete binary symbols in accordance with either of the following processes:

I. receiving a symbol (n) and filtering said symbol (n) to generate a filtered symbol (n), said symbol (n) being one of said plurality of discrete binary symbols;

differentially detecting said filtered symbol;

determining a first phase $\Theta(n)$ of said filtered symbol (n) by a phase slicer;

determining a second phase $\Theta(n)$ of said filtered symbol (n) by an arc tangent processor; and determining the phase error signal; or II. correcting the interference between each of said discrete binary symbols for all symbols stored;

outputting each corrected symbol, one at a time;

determining a first phase $\Theta(n)$ of a symbol (n), said symbol (n) being one of said plurality of discrete binary symbols by a phase slicer;

determining a second phase $\Theta(n)$ of said symbol (n) by an arc tangent processor; and determining the phase error signal.

* * * * *